(12) United States Patent
Louise

(10) Patent No.: US 7,742,855 B2
(45) Date of Patent: Jun. 22, 2010

(54) METHOD FOR OPERATING A MOTOR VEHICLE ALTERNATOR-STARTER

(75) Inventor: Christophe Louise, Alforville (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 0 days.

(21) Appl. No.: 11/718,562

(22) PCT Filed: Jan. 17, 2006

(86) PCT No.: PCT/FR2006/000099

§ 371 (c)(1),
(2), (4) Date: Jan. 22, 2009

(87) PCT Pub. No.: WO2006/079700

PCT Pub. Date: Aug. 3, 2006

(65) Prior Publication Data

US 2009/0125176 A1    May 14, 2009

(30) Foreign Application Priority Data

Jan. 26, 2005   (FR)  ................................. 05 00812

(51) Int. Cl.
*G01M 17/00*   (2006.01)

(52) U.S. Cl. .................. 701/29; 701/36; 310/156.56; 290/36 R; 307/10.6; 307/13; 318/478; 322/59

(58) Field of Classification Search .................... 701/29, 701/33, 36; 290/22, 36 R; 310/54, 64, 68 D, 310/156.56; 318/478; 322/59; 307/10.6, 307/13

See application file for complete search history.

(56) References Cited

U.S. PATENT DOCUMENTS

| | | | | |
|---|---|---|---|---|
| 5,097,140 A | * | 3/1992 | Crall | ......................... 290/36 R |
| 7,224,093 B2 | * | 5/2007 | Abadia et al. | ............. 310/68 B |
| 2007/0057511 A1 | * | 3/2007 | Taspinar et al. | ............... 290/22 |

FOREIGN PATENT DOCUMENTS

| | | |
|---|---|---|
| DE | 102 54 069 A1 | 6/2004 |
| EP | 1 429 021 A2 | 6/2004 |
| EP | 1 489 295 A2 | 12/2004 |

* cited by examiner

*Primary Examiner*—Gertrude Arthur Jeanglaud
(74) *Attorney, Agent, or Firm*—Berenato & White, LLC

(57) ABSTRACT

A method for operating a reversible polyphase rotating electrical machine (2) in a motor vehicle, which consists in performing the high-level and low-level management of the machine with a remote-control unit (1), which exchanges physical data, via a plurality of links (3), with a power module (20) integrated in or immediately proximate the machine (2). The method and electrical machine may be an alternator-starter.

15 Claims, 3 Drawing Sheets

METHOD FOR OPERATING A MOTOR VEHICLE ALTERNATOR-STARTER

FIELD OF THE INVENTION

The present invention concerns a method for making a reversible polyphase rotary electrical machine for a motor vehicle function.

The invention concerns in general terms the choice of the electronic architecture and the management of the functioning of reversible polyphase rotary electrical machines such as alternator starters.

The invention finds applications in particular in the field of motor vehicles. It applies more generally to the control of any alternator starter, or motor alternator, or motor alternator starter, with direct drive or by belt.

PRIOR ART

In a conventional alternator (that is to say non-reversible), there exists a regulator whose role is to regulate the voltage of the on-board system whatever the current output by the machine. The regulator may be of the controlled type. It is then interfaced with a control box, in particular an engine control box, by means of a low throughput link, for example a LIN link (Local Interconnect Network—"LIN Specification Package", Revision 2.0, 23 Sep. 2003), transmits regulation instructions to it. This type of "regulator/control box" system does not require any particular control of the machine, apart from control of the regulation.

In a system comprising a reversible machine, the power and control electronics are integrated in the said machine, as described in the document WO 04/006423. This alternator starter is said to be integrated in that it comprises a control and power module able to be integrated in or on the box containing the electromechanical assembly of the machine. This module comprises on the one hand a power unit having a bridge of MOS power transistors as voltage rectifier elements (in alternator mode) and as elements for switching the phase windings of the said machine (in starter or motor mode) as well as a chopping unit for supplying the excitation winding of the machine rotor, and on the other hand a control unit having driver circuits ("Driver Circuits" in English) for controlling the circuits, and a driver management circuit. This control and power module manages the rectifying voltage regulation (in alternator mode) and also manages the starting (in motor or starter mode). In other words, the control of the alternator starter from outside is essentially limited to indicating to it whether it must function in starter mode or in alternator mode.

However, there is currently a development in the starting function, with the appearance of "Stop and Start" algorithms (stoppage of the thermal engine during phases of stoppage of the vehicle, and restarting as soon as the driver takes any action or on another criterion) aimed at generating fuel savings. This appearance of an advanced alternator starter is accompanied by the taking into account of a relatively high number of items of information generated by sensors on the one hand and the use of relatively complex software (therefore requiring relatively high storage memory capacity, and a relatively high processing power for its execution) on the other hand.

In order to receive such information, it is necessary in particular to install a multi-pin connector (for example a 36 channel connector) at the rear of the alternator starter and to provide relatively extensive software and processing resources at the machine.

This poses problems of reliability and cost, because of the severity of the thermal and vibratory environment.

DISCLOSURE OF THE INVENTION

An object of the present invention is to propose an alternative to the electronic architecture and to the management of the functioning of an alternator starter responding to the problems identified above.

To this end, a first aspect of the invention proposes a method for making a reversible polyphase rotary electrical machine for a motor vehicle function, characterised in that a high-level and low-level management of the machine is performed by a remote control unit that exchanges physical information, via a plurality of hard-wired links, with a power module integrated in or in the immediate vicinity of the said machine.

The said physical information is commands from the power module situated in the immediate vicinity, for example at the rear of the said machine or integrated in the machine box.

High-level management of a reversible polyphase rotary electrical machine means in particular the complete management of the sensors useful to the management of the starting function (and restarting for the "Stop and Start" function) as well as automatic stopping/restarting algorithms and algorithms for managing the state of charge and/or health of the battery also providing its diagnosis. This high-level management also comprises management of information issuing from an inter-system communication bus of the vehicle with a view to controlling the said machine, for example by establishing simple instructions (low-level commands) necessary for the functioning of the machine.

In fact, low-level management of such a machine means in particular the instructions indicating to the machine whether it must function in a starter, motor or alternator mode, the instructions for regulating the vehicle system voltage or the current output by the machine, the diagnosis concerning the functioning of the machine (management of thermal, electrical or mechanical faults) and at least one vehicle operation safety function (preventing starting).

Finally, the management of the physical information includes the control of the MOS power transistor supplying the phase voltages (in starter or motor mode) or effecting synchronous rectification (in alternator mode) as well as the control of the excitation current in order to ensure regulation of the voltage or the current generated by the machine.

Thus the invention makes it possible to avoid the use of cables on which high electric powers are conveyed (namely the power delivered by MOS transistors of the inverter that supplies the armature windings of the machine) between the machine and a remote control and power module by integrating the power electronics at the rear of the machine, thus making it possible to gain in reliability and safety, although the machine is placed in a very severe thermal and vibratory environment.

Moreover, the division of the management of the functioning of the machine into a high-level part and a low-level part (effected outside the machine) on the one hand and a hardware part (effected in the machine) on the other hand makes it possible to benefit from the advantages of an offset control: isolation with respect to the very severe thermal and vibratory environment, software and hardware resources easily available, great flexibility compared with the on-board system application and architectures (only one battery, two batteries in parallel, two batteries in series in particular on starting, system combining battery and supercapacitors etc). There will in fact be a single microprocessor in an offset control unit and consequently a single standard architecture whatever the nature of the on-board system of the vehicle (14V, 42V). In addition, having an offset control unit makes it possible not to be limited in terms of resources to be integrated in the said unit.

In addition, this offers the possibility of integrating the high-level and low-level management in an already existing central control unit (an intelligent ancillary box, an engine control box, a box managing the on-board system in the case of a system using several batteries or supercapacitors, etc) since this integration does not require any resources in terms of power electronics (integration of software resources and addition of digital and/or analogue inputs/outputs). The advantage is therefore also with regard to the cost of the system (machine and offset electronics).

Finally, using hard-wired links makes it possible to transmit a single item of information per link whether it be digital or analogue, the said information depending on no communication protocol.

Thus hard-wired links in the said plurality are intended to transmit:
  information relating to the position of the machine rotor,
  and/or information on the machine temperature,
  a command for selecting an operating mode of the machine,
  and/or at least one command relating to management of the operating safety of the system,
  and/or instructions on switchings of switches of a power bridge of the machine.

Moreover, the management of the operating safety of the machine comprises a command inhibiting the motor and/or starter mode of the machine.

In addition, the plurality of links comprises:
  at least one power supply link, and
  and/or an earth connection.

In addition, according to a first embodiment, the control unit comprises an excitation circuit of the machine. In this case, the plurality of links comprises two electrical links connecting ends of an inductor winding of the machine.

According to a second embodiment, the excitation circuit controlling the rotor current is included in the machine and is no longer in the control unit. In this case, hard-wired links of the said plurality are intended to transmit:
  a command controlling an excitation transistor,
  and/or a command controlling a protection transistor,
  and/or information on a rotor current of the machine,
  and/or information on a rotor voltage of the machine.

A second aspect of the invention concerns a reversible polyphase rotary electrical machine for a motor vehicle, comprising a power module integrated in or in the immediate vicinity of the machine coupled to a remote control unit, via a plurality of hard-wired links, the said control unit being intended to perform a high-level and low-level management of the machine.

Finally, a third aspect of the invention concerns a control unit for a motor vehicle for performing a high-level and low-level management of a remote reversible polyphase rotary electrical machine, adapted to be coupled to a power module of the said machine, via a plurality of hard-wired links.

The control unit can be an engine control box, and intelligent ancillary box (IAB), an engine ancillary box (EAB), a battery disconnection unit, a box managing the state of charge and health of a battery or a box managing switchings between several batteries or supercapacitors. In a variant, in particular if the aforementioned equipment does not have enough hardware and/or software resources, or have not been designed for this purpose, the control unit may take the form of a control unit dedicated to the control of the alternator starter. This unit may interface with at least one of the aforementioned items of equipment, via a bus (dedicated or inter-system) such as a CAN bus or equivalent.

The control unit can be solely dedicated to the function of the high-level and low-level management of the machine, or fulfil other functions simultaneously.

The communication between the power module of the machine and the remote control unit must make it possible to transmit the information necessary to the correct functioning of the machine whilst ensuring robustness and safety of operation despite the severe thermal and vibratory environment in which it is situated. The aforementioned information relates in particular to the choice of the operating mode of the machine (in alternator mode or in starter mode), to the instructions for switching the power transistors in starting mode, to the safety of operation of the system (inhibition of motor or starter mode of the machine) etc. The power module can also send information to the control unit, in particular the temperature of the power bridge or a functional diagnosis of the bridge and machine. In addition the power module comprises Hall effect sensors for giving the relative position of the rotor. Finally, one or more power supply lines can pass between the control unit and the power module.

BRIEF DESCRIPTION OF THE FIGURES

Other characteristics and advantages of the invention will also emerge from a reading of the following description. This is purely illustrative and must be read with regard to the accompanying drawings, on which.

On the drawings, identical or similar elements bear the same references throughout all the figures.

DETAILED DESCRIPTION OF EMBODIMENTS OF THE INVENTION

Figure 1:
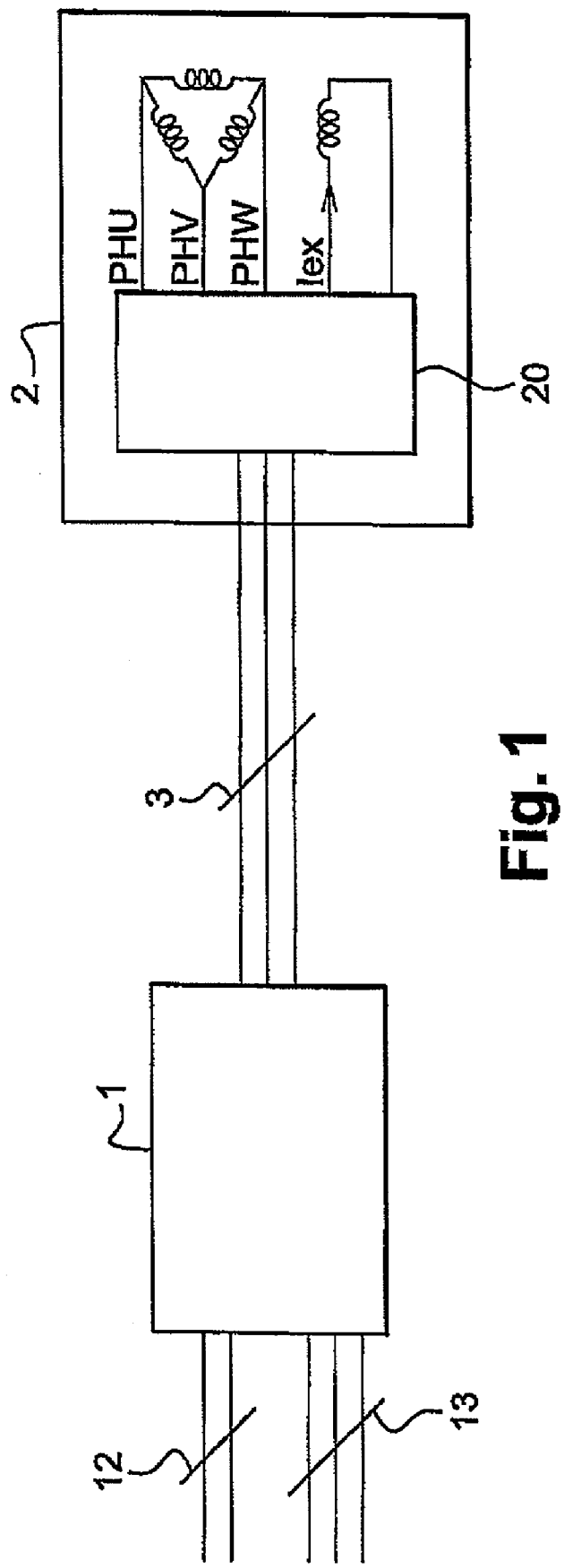
FIG. 1 is a diagram illustrating the principle of management of the functioning of a machine according to the present invention.

FIG. 1 illustrates the principle of the management of a reversible rotary electrical machine according to the present invention.

A control unit 1 is coupled to a reversible rotary electrical machine 2, such as an alternator starter, and more particularly to a power module 20 thereof.

This coupling is carried out via a plurality of hard-wired links 3. The control unit 1 and the machine 2 are said to be distant from each other, in that one is offset with respect to the other, that is to say it is situated at a non-zero distance. The wires of the plurality of links 3 therefore have a non-zero length, for example a few tens of centimeters or even several meters. It should be stated that a hard-wired link is a wire for transmitting analogue or digital information.

The high-level and low-level management of the functioning of the machine 2 is carried out by the control unit 1, which controls the said machine via a plurality of links 3. The high-level management comprises, in particular:

management of the sensors useful to the starting (and restarting) function, one or more S&S automatic stop/restart algorithms normally referred to in English as "Stop and Start", and management of the state of charge and/or the diagnosis of the battery.

To this end, the control unit 1 comprises hardware resources (in particular a microprocessor, memory, multichannel connector, etc) and relatively complex software resources.

The control unit 1 converts the information coming from vehicle sensors received by the hard-wired links 13 (analogue or digital links) and the information issuing from an inter-system communication bus (the main communication bus of the vehicle connecting in particular the engine control) 12 into low-level commands. The control unit can thus, for example, send a start instruction (low-level command) to the machine if a starting demand is present on the inter-system bus and the information issuing from the sensors indicating the position of the brake pedal, the position of the gearbox and the position of the clutch so permits.

In fact, low-level management of such a machine means in particular:

the instructions indicating to the machine whether it should function in starter mode or in alternator mode, the regulation instructions in alternator mode, and the diagnosis concerning the functioning of the machine (management of thermal, electrical or mechanical faults).

Finally, the hardware management of the machines is carried out at the module 20 and includes:

the control of the MOS power transistors applying the phase voltages PHU, PHV and PHW in the case of a three-phase machine (in starter or motor mode) or carrying out the synchronous rectification (in alternator mode), as well as the regulation of the voltage or current generated by the machine.

In practice, the module 20 can be situated inside the casing of the machine 2, or in its immediate vicinity, for example fixed to the rear thereof.

These power electronics 20 comprise essentially MOS power transistors and driver circuits that control these transistors. It may, in an advantageous but not limiting embodiment, also include position sensors for the rotor and/or a temperature sensor for the power bridge of the machine.

Figure 2:
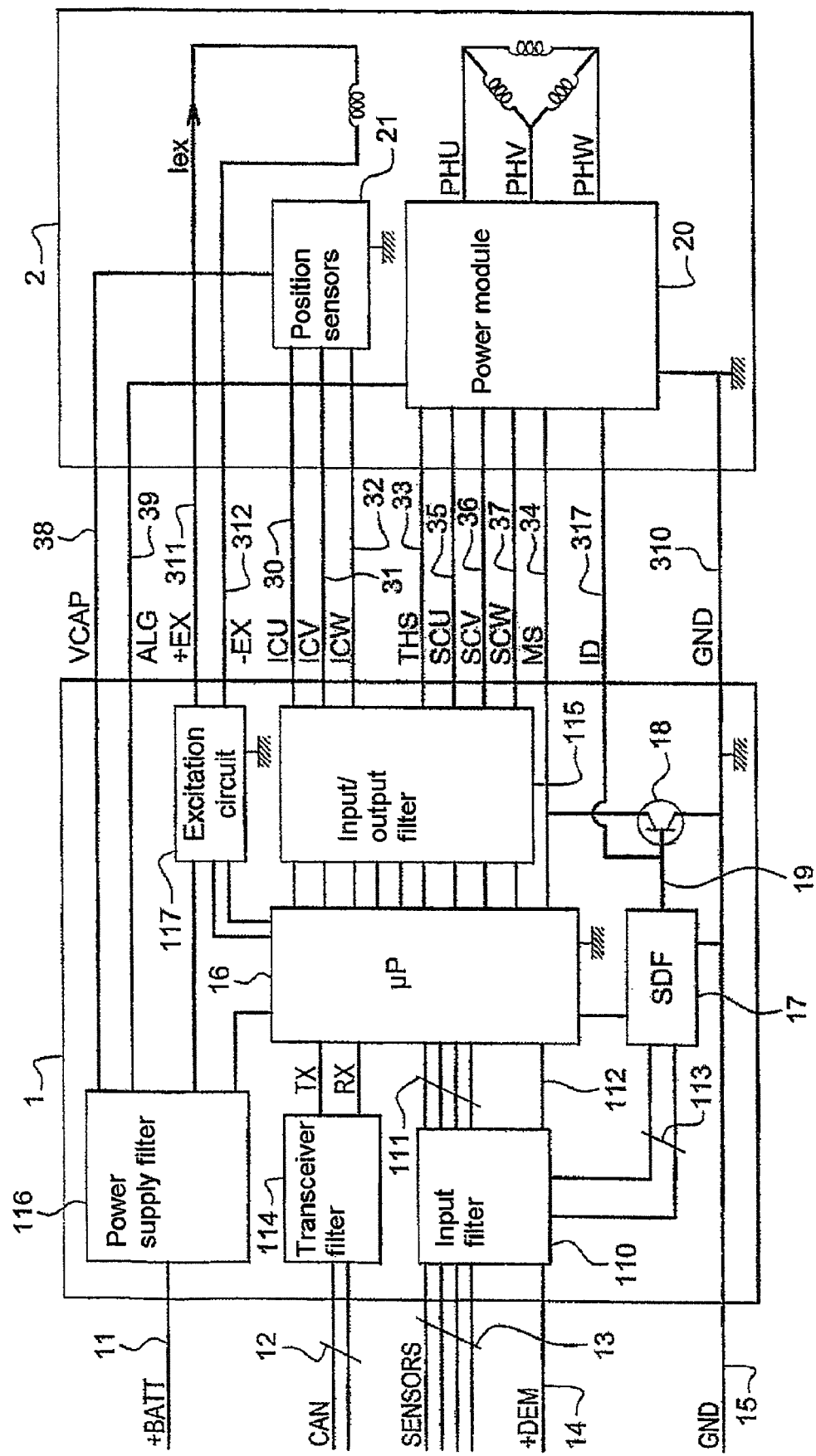
FIG. 2 is a diagram illustrating a first embodiment of the operating principle according to the invention with an excitation circuit integrated in a power module of the machine.

The diagram in FIG. 2 illustrates a first non-limiting embodiment of an implementation of the present invention.

In this mode, the inter-system communication link 12 is a CAN bus (Controller Area Network—ISO 11898).

The control unit 1 comprises here a microprocessor (μP) 16, for example a 16-bit microprocessor, connected to a set of sensors SENSORS via a plurality of cable lines 13. The microprocessor 16 is also connected to the starter switch (not shown) of the vehicle via a wire 14, in order to receive a start command signal +DEM.

The microprocessor 16 is adapted to control the high-level management of the machine. It comprises in particular the battery management BMS (Battery Management System) and automatic stop/start S&S (Stop and Start algorithm).

It executes a management program in order in particular to manage hardware management commands for the machine 2.

Among these commands, there are in particular:

a command for the functional mode of the machine MS34, the signals SCU 35, SCV 36 and SCW 37, which control the switchings of the power transistors of the inverter in starter mode, and the regulation of the current generated by the machine by controlling the excitation circuit.

A plurality of hard-wired links 3 allow an exchange of this information between this control unit 1 and the machine 2.

It should be noted that preferentially the control unit 1 also comprises an operating safety unit (SDF) 17, which is connected to several sensors (not shown) for the plurality of hard-wired lines 13. According to the signals generated by these sensors, the unit 17 generates information that is transmitted to the microprocessor 16 and in addition the unit 17 generates a starting inhibition signal ID 19 (for example in the case where a gearbox sensor indicates that a gear is engaged), which allows the inhibition of starting despite faulty software management (malfunctioning of the microprocessor for example), and this by virtue of the means 18, here a transistor, which makes it possible to force the signal MS 34 to earth. In addition the information ID is communicated to the power module 20 by the link 317 for the purpose of being able to inhibit the motor or starter mode as close as possible to the machine. This is because, in the case of a short-circuiting of the signal MS 34 between the unit 1 and the machine 2, the operating safety of the machine remains assured since the starting will be enabled only if the logic state of the signal ID so permits.

It should also be noted that the unit 17 is entirely implemented in hard-wired logic, in order not to be affected by any software failure.

The control unit 1 comprises, in addition to the elements already presented above with regard to the diagram in FIG. 2, an input management unit 110 implemented for example in hard-wired logic, a filter followed by a CAN transceiver 114, disposed between the inter-system CAN bus 12 and the microprocessor 16, an input/output management unit 115, implemented for example in hard-wired logic, a power supply circuit, and an excitation circuit 117.

These elements are described below:

the unit 110 receives:

the sensor signals (gearbox, clutch position, brake circuit pressure) through the hard-wired links 13, and the start control signal +DEM over the link 14.

It delivers:

the filtered sensor signals 111 to the microprocessor 16, the filtered signal +DEM 112 to the microprocessor 16, and some 113 of the filtered sensor signals to the operating safety unit 17.

The CAN transceiver 114 (and its input filtering) disposed between the inter-system CAN bus 12 and the microprocessor 16 implements the physical interface of this CAN bus. The signals respectively received from and transmitted to the transceiver 114 by the microprocessor 16 are denoted RX and TX.

The input/output management unit 115 receives the signals from the rotor position sensors over the links 30, 31 and 32 and the signal THS indicating the temperature of the bridge over the link 33. It delivers the signals SCU 35, SCV 36 and SCW 37, which control the switchings of the power transistors of the inverter in starter mode from the signals of the rotor position sensors.

The power supply circuit 116 is capable of supplying the unit 1, the drivers of the power module of the machine and the rotor position sensors.

The excitation circuit 117 is connected between the rotor windings of the machine by the links +EX 311 and −EX 312. It comprises an excitation chopper and a freewheeling diode for magnetising the rotor and may also comprise a protection transistor allowing rapid demagnetisation of the rotor where necessary (load dump or short-circuiting of the excitation chopper for example).

As for the machine 2, this comprises a power module 20 that includes control of the MOS power transistors applying the phase voltages (in starter mode) or effecting the synchronous rectification (in alternator mode). This module 20 comprises a set of driver circuits and MOS power transistors of the inverter of the machine, generating the phase signals PHU, PHV and PHW. The machine 2 can also include a unit 21, independent or integrated in the power module 20, which comprises sensors giving the position of the rotor. In a non-limiting embodiment, the said sensors are Hall effect sensors and are three in number.

The plurality of links 30 comprise links for transmitting:
a signal MS 34 controlling the operating mode of the driver circuits (starter mode when MS=1 and alternator mode when MS=0),
a signal ID 317 allowing inhibition of motor or starter mode,
signals controlling switching of the power transistors of each of the phases SCU 35, SCV 36 and SCW 37, respectively for each of the phases of the machine (here for a three-phase machine), and
signals ICU 30, ICV 31 and ICW 32 issuing from Hall effect sensors giving to the control unit 1 the relative position of the machine rotor.

The plurality of links 3 also comprises:
a power supply wire VCAP 38 for supplying these said sensors,
a power supply wire ALG 39 for supplying the drivers, and
an earth connection 310 and a connection THS 33 connected to a temperature sensor integrated in the power module 20.

Figure 3:
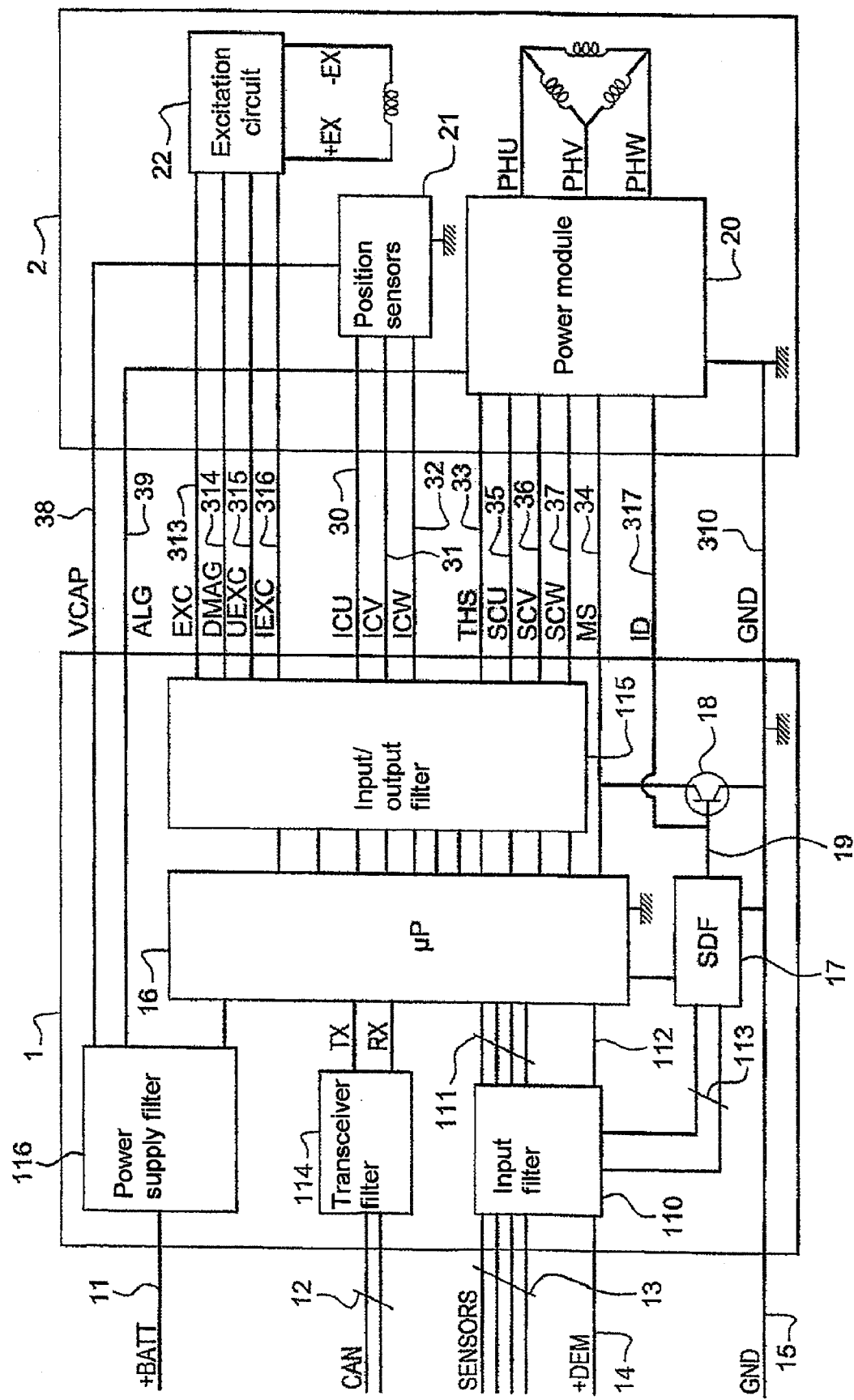
FIG. 3 is a diagram illustrating a second embodiment of the operating principle according to the invention with an excitation circuit integrated in a remote control unit.

The diagram in FIG. 3 illustrates a second non-limiting embodiment of an implementation of the present invention for which the excitation circuit is integrated in or close to the power module 20. The control unit 1 is then identical to the example in FIG. 2 but without the excitation circuit 117. In this case the said control unit no longer contains any power elements. This makes it possible to use a simple and inexpensive substrate (of the PCB type for example) adapted to control electronics.

In this case, among the plurality of hard-wired links 3, there are also found links for transmitting:
a command EXC 313 for the excitation chopper situated in the excitation circuit, a command coming from the control unit 1, and
a command DMAG 314 for the protection transistor of the excitation circuit (makes it possible to demagnetise the rotor more quickly in the case of load dump, for example, and to protect the machine in the case of short-circuiting of the excitation transistor).

In addition, among the plurality of hardware links 3, there are also found:
two links UEXC 315 and IEXC 316 transmitting respectively information on the value of the excitation voltage and on the excitation current.

It should be noted that, in this mode, the inter-system communication link 12 is also a CAN bus (Controller Area Network—ISO 11898).

The invention claimed is:

1. A method for operating a reversible polyphase rotary electrical machine for a motor vehicle function, comprising the step of performing a high-level management and a low-level management of the machine by a remote control unit that exchanges physical information, via a plurality of hard-wired links, with a power module integrated in or in the immediate vicinity of the electrical machine;
the plurality of hard-wired links comprising two electrical links connecting ends of a field winding of the electrical machine.

2. The method according to claim 1, wherein the step of the high-level management of the machine comprises at least one of:
management of sensors useful to a starting and restarting function;
at least one automatic stop/restart algorithm;
management of at least one of the state of charge, health and diagnosis of a battery; and
management of information issuing from an inter-system communication bus of the vehicle in order to control the machine.

3. The method according to claim 1, wherein the step of low-level management of the machine comprises at least one of:
a choice of the functional mode of the machine;
regulation of the voltage of the vehicle system or of the current output by the machine;
at least one operating safety function for the vehicle; and
a diagnosis of the machine.

4. The method according to claim 1, wherein the plurality hard-wired links is adapted to transmit at least one of:
information relating the position of a rotor of the machine; and
information on the temperature of the machine.

5. The method according to claim 1, wherein the plurality of hard-wired links is adapted to transmit at least one of:
a command for selecting an operating mode of the machine;
at least one command relating to a management of the operating safety of the system; and
switching instructions for switches in a power bridge (35-37) of the machine.

6. The method according to claim 1, wherein the plurality of hard-wired links comprises at least one of:
at least one power-supply link; and
an earth connection.

7. The method according to claim 5, wherein the command relating to the management of operating safety of the vehicle comprises a command inhibiting at least one of a motor mode and a starter mode of the machine.

8. The method according to claim 1, wherein the plurality of hard-wired links is adapted to transmit at least one of:
a command controlling an excitation transistor;
a command controlling a protection transistor;
information on a rotor current of the machine; and
information on a rotor voltage of the machine.

9. A reversible polyphase rotary electrical machine for a motor vehicle, comprising a power module integrated in or in the immediate vicinity of the machine coupled to a remote control unit via a plurality of hard-wired links:
the control unit (1) being adapted to perform a high-level and low-level management of the machine;
the plurality of hard-wired links comprising two electrical links connecting ends of a field winding of the electrical machine.

10. The machine according to claim 9, wherein the power module is composed of several power stages each dedicated to the control of a phase of the machine and comprising power transistors and their associated drivers.

11. The machine according to claim 9, wherein the power module comprises an excitation stage controlling rotor current.

12. A control unit for a motor vehicle for performing a high-level and a low-level management of a remote reversible polyphase rotary electrical machine adapted to be coupled to a power module of the machine via a plurality of hard-wired links;

the plurality of hard-wired links comprising two electrical links connecting ends of a field winding of the electrical machine.

13. The control unit according to claim 12, in which the high-level management of the machine comprises at least one of:

management of sensors useful to a starting and restarting function, at least one automatic stop/restart algorithm;

management of the state of charge and/or diagnosis of a battery; and management of information issuing from an inter-system communication bus of the vehicle in order to control the machine.

14. The control unit according to claim 12, wherein the low-level management of the machine comprises at least one of:

a choice of the functional mode of the machine;

at least one operating safety function for the vehicle;

regulation of the voltage of the vehicle system or of the current output by the machine; and a diagnosis of the machine.

15. The control unit according to claim 12, further comprising an excitation circuit of the machine.

* * * * *